United States Patent [19]

Chen

[11] Patent Number: 5,493,353
[45] Date of Patent: Feb. 20, 1996

[54] DUAL VIDEO AND STILL-FILM CAMERA

[76] Inventor: Sayu Chen, 852 Corriente Pointe Dr., Redwood Shores, Calif. 94065

[21] Appl. No.: 333,138

[22] Filed: Nov. 1, 1994

[51] Int. Cl.[6] ............................ G03B 29/00; H04N 5/225
[52] U.S. Cl. ............................................. 354/76; 348/220
[58] Field of Search .............................. 354/76; 348/220, 348/233

[56] References Cited

U.S. PATENT DOCUMENTS

| | | | |
|---|---|---|---|
| 2,229,497 | 1/1966 | Goldfarb | 73/5 |
| 3,913,376 | 10/1975 | Scott | 73/5 |
| 4,031,739 | 6/1977 | Springer | 73/5 |
| 4,064,517 | 12/1977 | Maitani et al. | 354/461 |
| 4,064,736 | 12/1977 | Ireland | 73/5 |
| 4,096,732 | 6/1978 | Springer | 73/5 |
| 4,230,400 | 10/1980 | Wick et al. | 354/403 |
| 4,335,945 | 6/1982 | Johnson et al. | 354/401 |
| 4,738,526 | 4/1988 | Larish | 354/412 |
| 4,763,146 | 8/1988 | Niikura | 354/75 |
| 4,825,290 | 4/1989 | Iida et al. | 354/76 |
| 4,829,383 | 5/1989 | Harase et al. | 348/220 |
| 4,829,384 | 5/1989 | Iida et al. | 348/220 |
| 4,831,450 | 5/1989 | Sato et al. | 348/220 |
| 4,903,055 | 2/1990 | Lourette et al. | 354/21 |
| 4,959,676 | 9/1990 | Matsuda et al. | 354/400 |
| 5,150,215 | 9/1992 | Shi | 348/220 |
| 5,353,079 | 10/1994 | Sakai et al. | 354/149.11 |
| 5,382,974 | 1/1995 | Soeda et al. | 348/221 |
| 5,410,225 | 4/1995 | Ishii et al. | 348/229 |
| 5,424,772 | 6/1995 | Aoki et al. | 348/220 |

FOREIGN PATENT DOCUMENTS 4-340942-A 11/1992 Japan.

*Primary Examiner*—Michael L. Gellner
*Assistant Examiner*—Nicholas J. Tucillo

[57] ABSTRACT

Dual video and still-film camera embodying video recorder camera technology in two popular types of still-film camera: single-lens reflex (SLR) (1) and compact (2). The most advanced digital image-sensing semiconductor chip (charge- coupled device or CCD) (4) (21) and circuit board (8) (23), as well as other functional video camera components, are combined with the conventional apparatus of the still-film camera to support the video and still-film modes of photography in a single camera casing. By means of a manual switch (9) (24) or, as an alternate embodiment, an electrical switch, the user can extend the digital image sensor (4) (21) into the light-image line of sight in order to activate video operation or can retract the image sensor in order to allow still-film operation unimpeded by the video apparatus.

3 Claims, 11 Drawing Sheets

DUAL VIDEO AND STILL-FILM CAMERA

BACKGROUND—FIELD OF INVENTION

The field of this invention relates to video cameras and to still-film cameras of the single-lens reflex (SLR) type and compact types, specifically to the combination of video and still-film apparatuses in a single camera to allow switching between video and still-film operation at will, and more specifically to the incorporation of a digital image sensor and circuit board in this dual-purpose camera in order to support video photography in a still-film type of camera environment.

BACKGROUND—DESCRIPTION OF PRIOR ART

Digital image sensors are currently being used in several diverse applications and particularly in the camera field. The two notable applications are video recorder cameras, including the more recently invented "camcorder" type, and still digital cameras.

In both of these applications, the image sensor, located at a focal point within the camera behind the lens, converts the light image to a digital signal which is processed for color and then recorded on magnetic tape. This signal in turn can be captured or played back as a video image on a CRT-type screen or as a still computer image ultimately reproducible on film negative and positive paper print.

Almost all image sensors currently being manufactured and used in today's video and digital camera applications are one of two types of solid-state semiconductors: the charge-coupled device (CCD) or the metal-oxide semiconductor (MOS). The CCD appears to be the chip of choice for most manufacturers. Up to the present moment in time, the high-resolution image sensors being manufactured have been too expensive to consider for application in a type of camera that would combine video and still-film operation. However, available manufacturing and marketing data indicates that shortly these limitations will no longer apply.

The object of this invention, therefore, is to modify the conventional still-film camera (SLR and compact types) by combining the still-film apparatus with the video apparatus, principally the image sensor and circuit board but also the other means for video recording, such as tape deck, video eyepiece, video head drum, sound recorder and playback mechanism, and controls. In addition to porting the necessary video apparatus to a still-camera fabrication, only a few simple and economic modifications, mechanical and electrical, have to be effected in order to make a very portable and easily-controlled dual camera.

SUMMARY OF INVENTION—OBJECTS AND ADVANTAGES

The objects and advantages of the invention are these:

1. Dual operation. The camera user can carry and use a single camera, lightweight and easily manipulated, to take both video and still-film pictures, whereas heretofore two cameras would have had to be carried if one intended to use both types of camera for the same photography session.
2. Equipment Backup. If in the middle of a photography session involving an unrepeatable event (a wedding, for example), the dual camera runs out of either video tape or film, the user can switch to the other media in order to capture something of the remaining event.

These objects and advantages will be obtained by the invention of a combination video and still-film camera which incorporates the most advanced image sensing technology (CCD) and a simple control allowing the user to easily switch from video to still-film operation or the reverse.

DESCRIPTION OF THE DRAWINGS

To more fully understand the invention, consider the detailed description which follows in conjunction with the attached drawings and reference numerals, wherein FIG. 1 (overview) is a perspective view of the two camera types (still-film and video) being combined in this invention, which is the third camera type, a dual video and still-film camera.

FIG. 2 (assembled SLR) is a perspective view of the fully assembled invention incorporating a single-lens reflex (SLR) type of still-camera apparatus.

FIG. 3 (preferred SLR) is a partially exploded view of the SLR type showing the principal apparatus for switching from still-film to video operation in the preferred, vertical-plane embodiment.

FIG. 4 (alternate SLR) is a partially exploded view of the SLR type showing the principal apparatus for switching from still-film to video operation in an alternate or horizontal-plane embodiment.

FIG. 5 (sensor extended) is an exploded view of the principal parts of the SLR type as activated when the image sensor (CCD) is extended into the light image line of sight for video operation.

FIG. 6 (sensor retracted) is an exploded view of the principal parts of the SLR type as activated when the image sensor (CCD) is retracted to allow still-film operation.

FIG. 7 (assembled compact) is a perspective view of the fully assembled invention incorporating a compact type of still-camera apparatus.

FIG. 8 (preferred compact) is a partially exploded view of the compact type showing the principal apparatus for switching from still-film to video operation in the preferred, vertical-plane embodiment.

FIG. 9 (alternate compact) is a partially exploded view of the compact type showing the principal apparatus for switching from still-film to video operation in an alternate or horizontal-plane embodiment.

FIG. 10 (sensor extended) is an exploded view of the principal parts of the compact type as activated when the image sensor (CCD) is extended into the light image line of sight for video operation.

FIG. 11 (sensor retracted) is an exploded view of the principal parts of the compact type as activated when the image sensor (CCD) is retracted to allow still-film operation.

Figure 1:
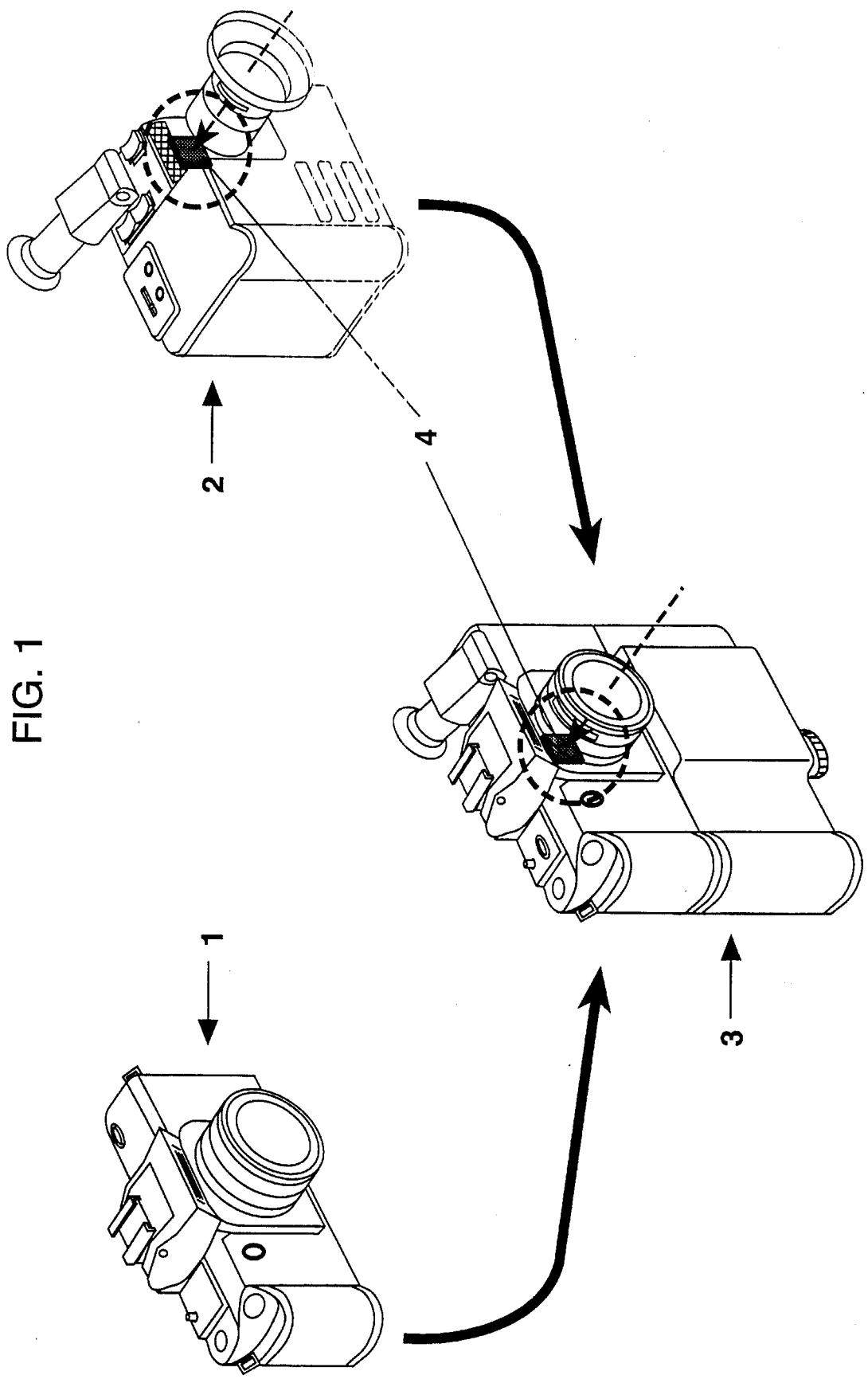

Reference Numerals in Drawings 1 single-lens reflex (SLR) camera

-continued

Reference Numerals in Drawings 2 compact camera
3 dual still-film and video camera
4 image sensor (CCD type)
5 video eyepiece
6 SLR-type lens
7 electrical contact points
8 image-sensor circuit board
9 switching worm gear and knob
10 video components casing
11 alternate video components casing
12 auxiliary components casing
13 refracting viewfinder prism
14 mirror
15 film
16 focal plane shutter
17 aperture diaphragm
18 video eyepiece
19 compact-type lens
20 electrical contact points
21 image sensor (CCD type)
22 video components casing
23 image-sensor circuit board
24 switching worm gear and knob
25 alternate video components casing
26 auxiliary components casing
27 focal plane chamber opening
28 spacer backing for image sensor
29 film
30 lens shutter
31 aperture diaphragm

DETAILED DESCRIPTION OF THE INVENTION

Because the invention can be embodied in either of two types of popular still-film cameras—single-lens reflex (SLR) or compact—this detailed description of the invention will discuss the two types separately.

1. Structure: Dual Camera With SLR-type Still-film Embodiment

Figure 2:
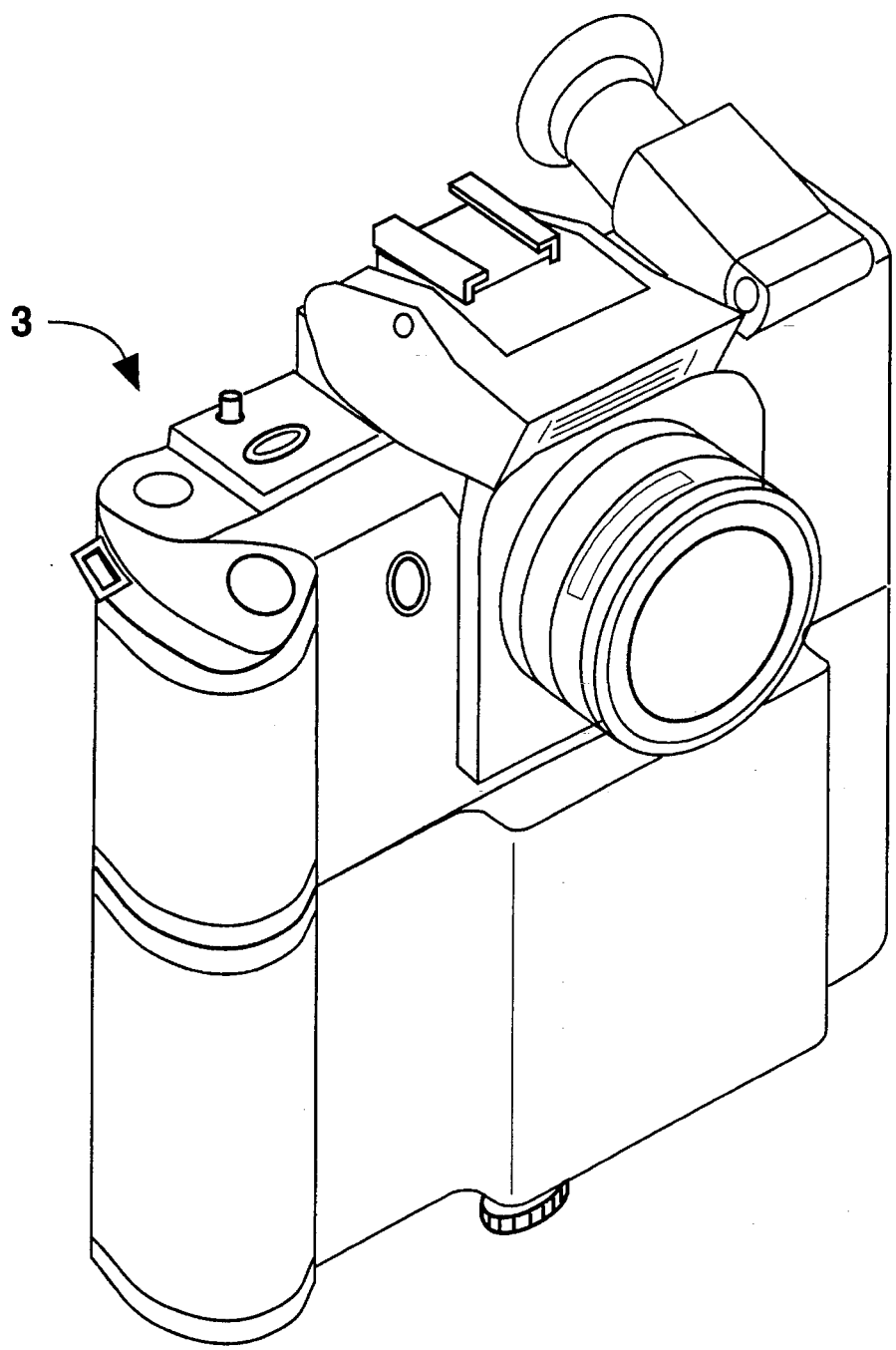
FIGS. 2–6 (figure summary) comprise various views of the invention incorporating a single-lens reflex (SLR) type of still-camera apparatus.

As illustrated in FIG. 1, the combination of still-film 1 and video camera 2 apparatuses in a dual-purpose camera 3 is dependent mainly on the incorporation of a digital image sensing or CCD semiconductor device 4 in the dual camera, with, of course, a camera casing (FIG. 2) large enough to contain these and other necessary film and video components. Looking at FIG. 3, note that in the SLR-type still-film embodiment a video eyepiece 5 is required for when the video mode is active. Note also that the SLR-type lens 6 and other SLR camera still-film components will be conventional and not ported over from other technologies.

Illustrated in FIG. 3, the preferred embodiment of the video apparatus is a video components casing 10 extended vertically below the still-film casing 3. FIG. 4 shows an alternate embodiment, with the video components casing 11 extended in a horizontal plane and a small auxiliary components casing 12 extended vertically.

Figure 3:
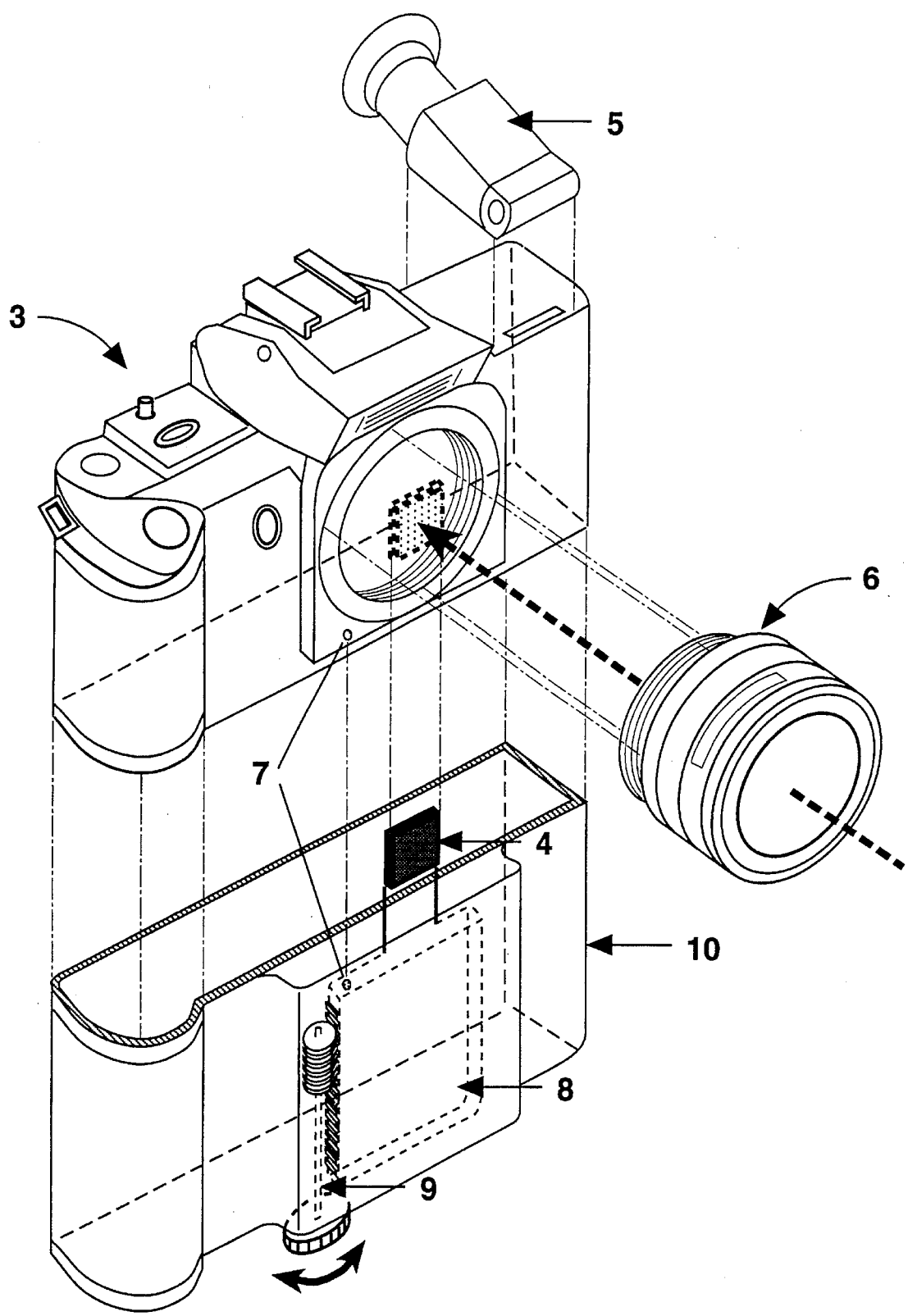
Figure 4:
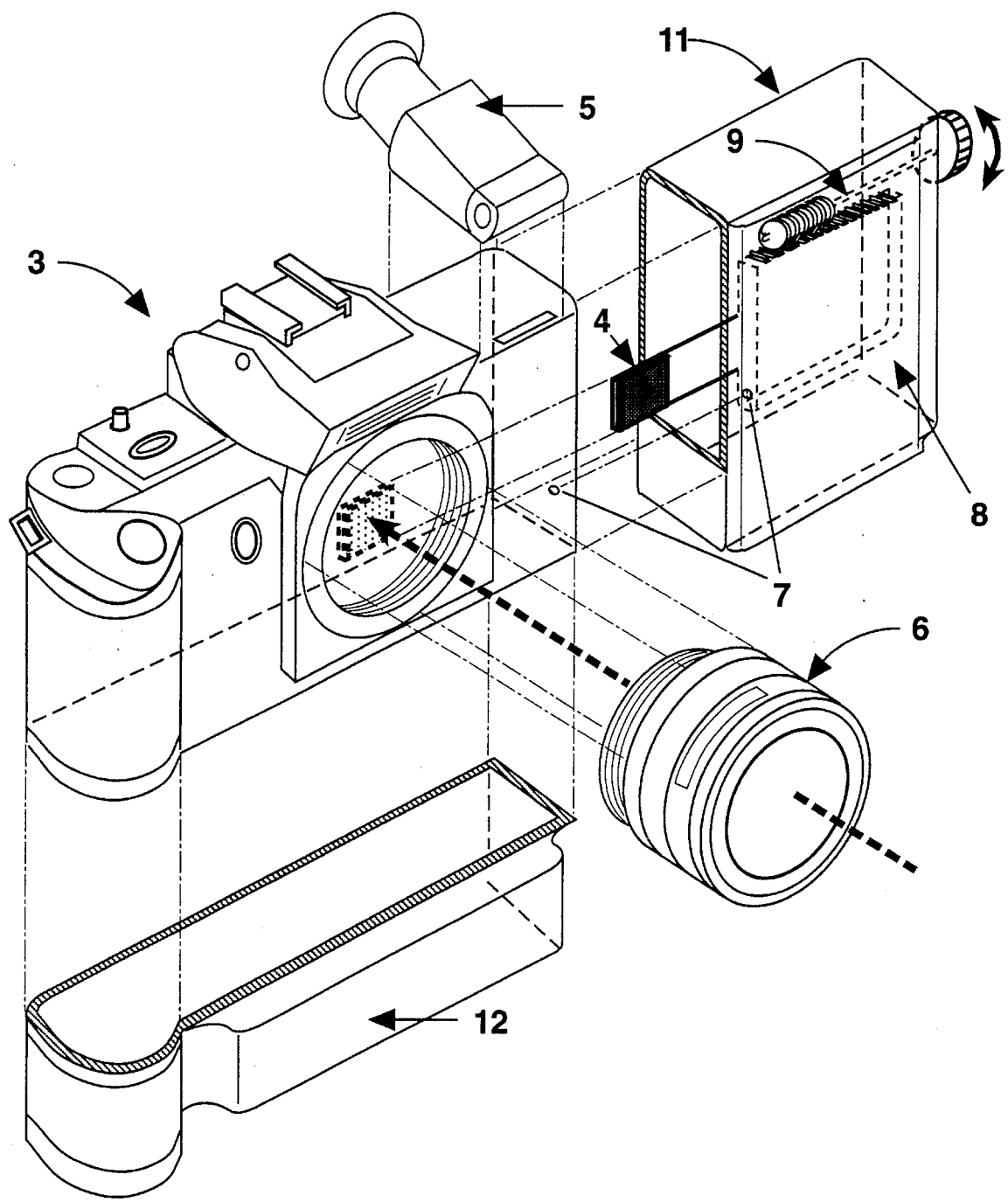

FIGS. 3 and 4 illustrate the principal innovation of the invention, a movable image sensor (CCD type) 4 and image-sensor circuit board 8. In these figures, the movement is managed by a switching worm gear and knob control 9. However, a feasible alternative not shown here is a motor-driven movement initiated by a button or lever control manipulated by the user.

2. Operation: Dual Camera With SLR-type Still-film Embodiment

Figure 5:
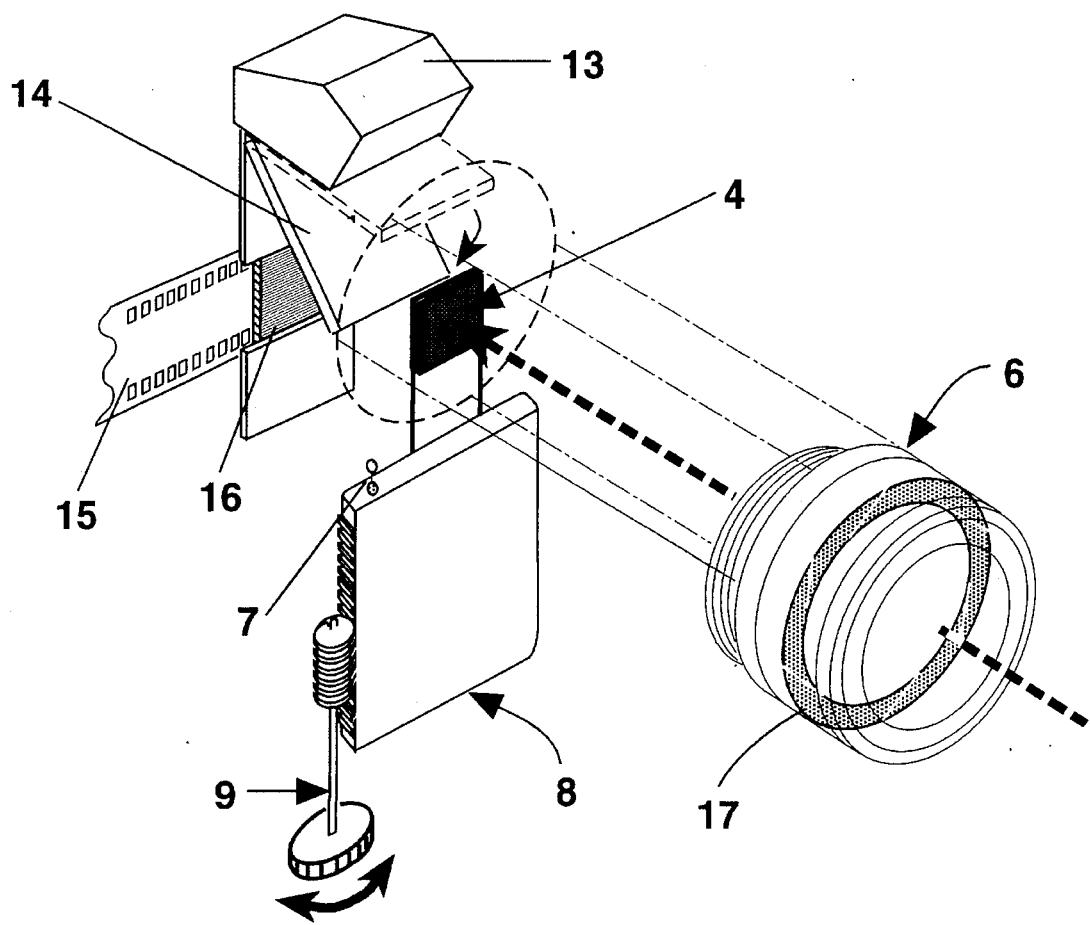

Operation of this SLR-type embodiment of the dual video and still-film camera begins with the user's decision on which mode to use. If the user elects the video mode (FIG. 5), he or she turns the switching worm gear and knob 9 to a fixed-click position in order to extend the image sensor 4 into the path of the light image. Now an electrical contact point 7 on the leading edge of the image-sensor circuit board 8 meets a corresponding contact point on the camera body, thereby completing a circuit connection to the camera's electronic micro controller. The micro controller in turn automatically immobilizes three still-film camera parts: the focal plane shutter 16, the mirror 14, and the aperture diaphragm 17 (if the aperture diaphragm is controlled automatically). The focal plane shutter is immobilized in the closed position during video operation in order to protect the film 15 from exposure to light, and the mirror is immobilized in the down position so that it cannot collide with the CCD in the active position. The aperture diaphragm is immobilized initially at a default opening set by the factory. However, the micro controller allows the manual diaphragm control, if there is one, to override the automatic, in case the user wishes to select an alternate f-stop or aperture opening.

Figure 6:
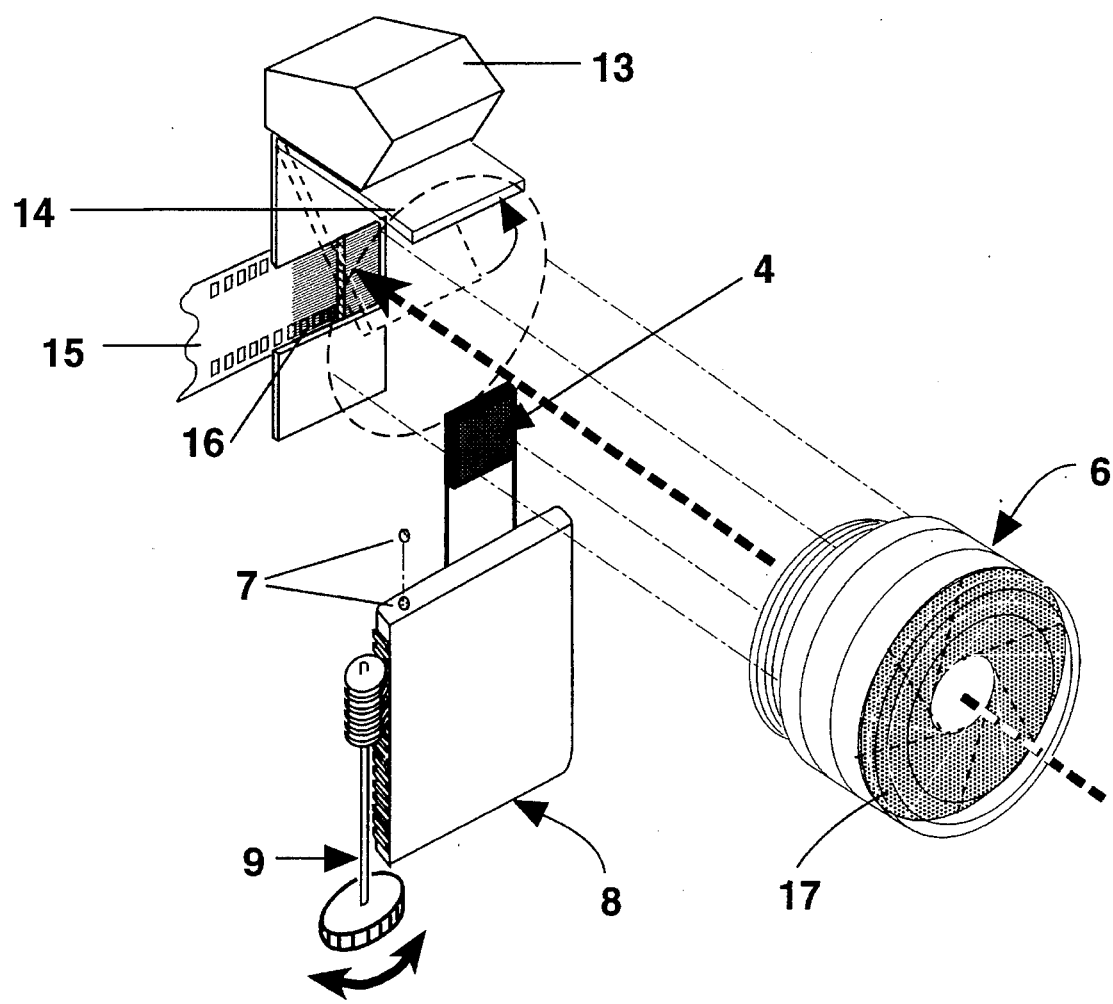

If the user elects the still-film mode (FIG. 6), he or she turns the switching worm gear and knob 9 in the opposite direction to a fixed-click position in order to retract the image sensor 4 completely outside the path of the light image. Now the electrical contact points 7 separate to break the circuit connection which had immobilized the focal plane shutter 16, the mirror 14, and the aperture diaphragm 17 As before, the user can manually adjust the aperture diaphragm (if this version of the camera has manual diaphragm control) or can accept the automatic setting. The shutter is freed to open when the user presses or turns the shutter release control. The mirror is freed to move to the up position when the user has completed viewing the image by means of the refracting viewfinder prism 13 and has pressed or turned the shutter release control, thereby allowing the light image to travel through the camera to strike the film.

1. Structure: Dual Camera With Compact-.type Still-film Embodiment

Figure 7:
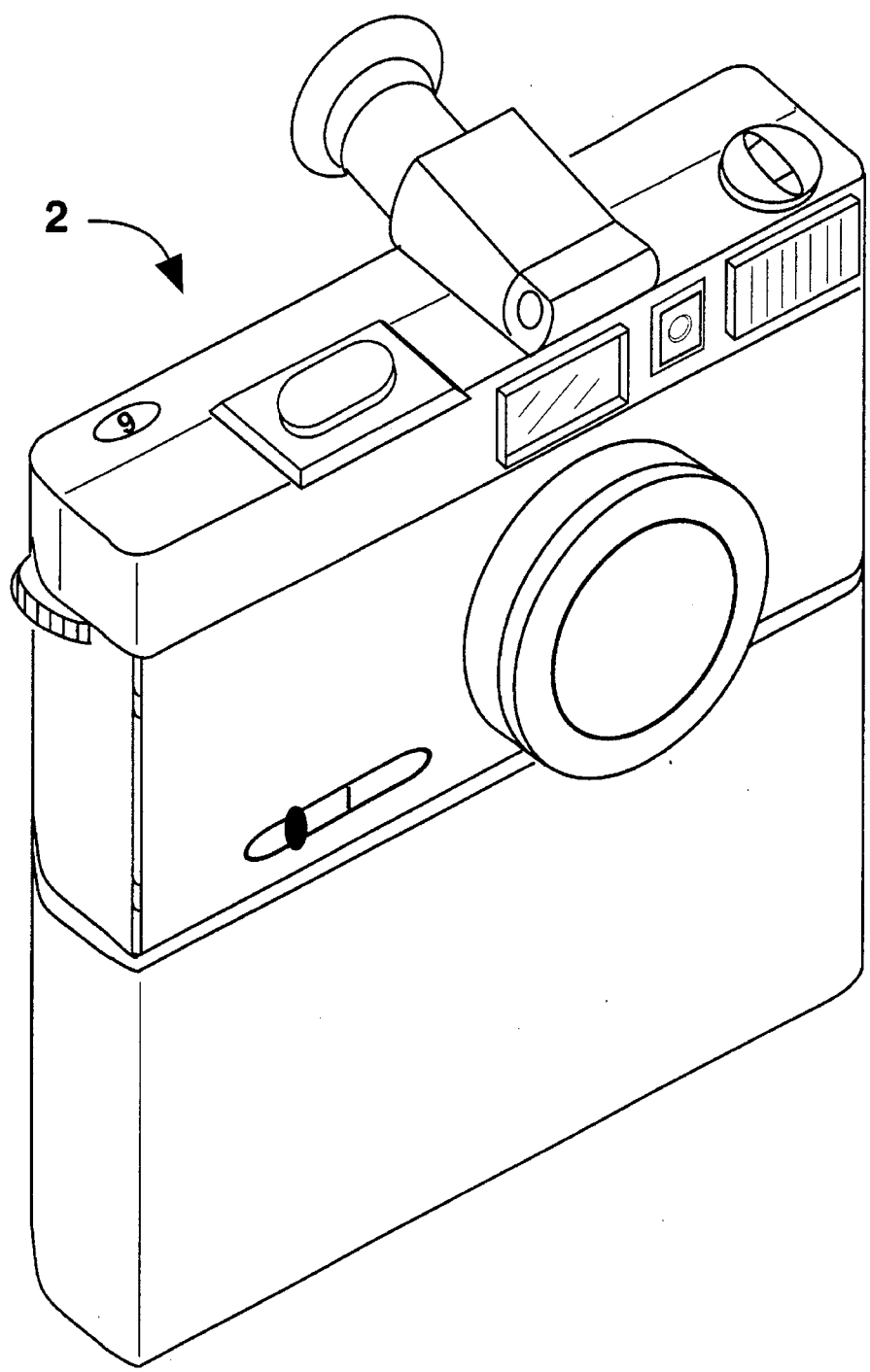
FIGS. 7–11 (figure summary) comprise various views of the invention incorporating a compact type of still-camera apparatus.

When the invention is embodied in a dual camera incorporating the compact-type of still-film apparatus, as with the SLR type there must be a camera casing (FIG. 7) large enough to contain the necessary still-film and video components when the video mode is active. Looking at FIG. 8, note that the compact-type lens 19 and other compact camera still-film components will be conventional and not ported over from other technologies. For the compact-type still-film embodiment, a video eyepiece 18 is a construction alternative or manufacturing option. Because the viewfinder of the compact-type apparatus yields a direct view of the image and does not require the refracting prism of the SLR-type, the video eyepiece is not needed for video operation unless the still-film viewfinder cannot produce the proper focus corresponding to the lens during video operation.

Illustrated in FIG. 8, the preferred embodiment of the video apparatus is a video components casing 22 extended vertically below the still-film casing 2. FIG. 9 shows an alternate embodiment, with the video components casing 25 extended in a horizontal plane and a small auxiliary components casing 26 extended vertically.

Figure 8:
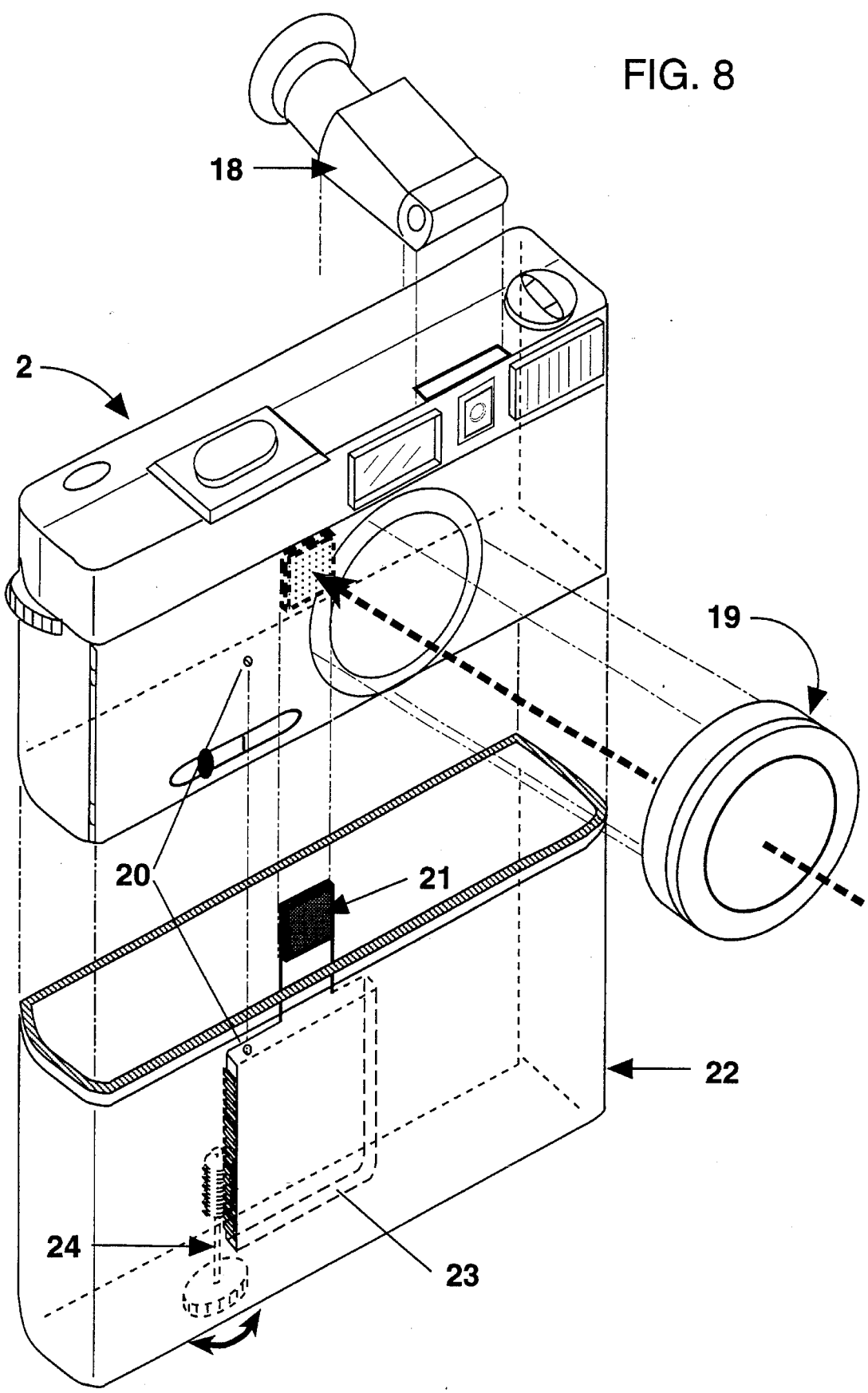
Figure 9:
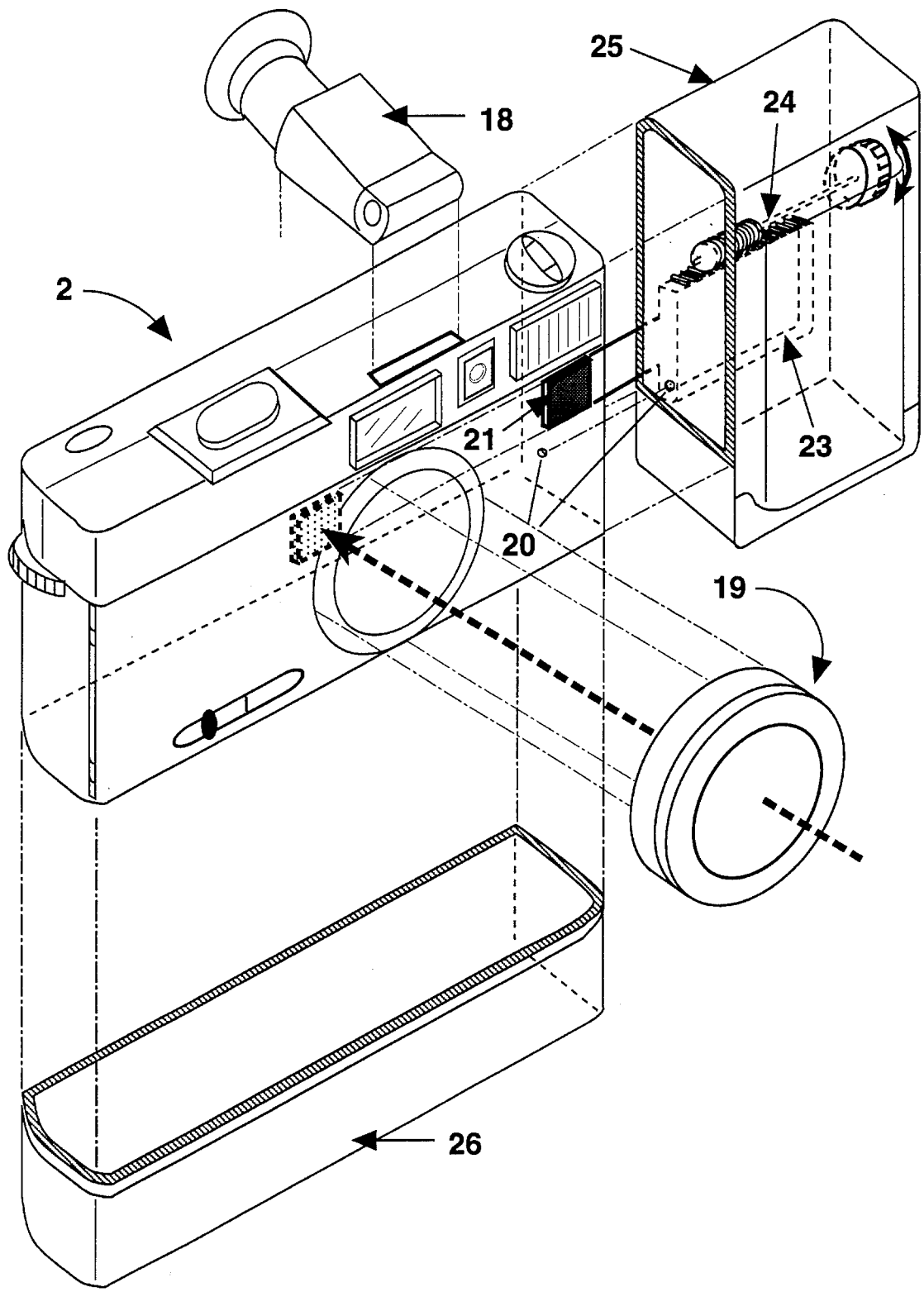

FIGS. 8 and 9 illustrate the principal innovation of the invention but accommodated to the compact-type of still-film apparatus, a movable image sensor (CCD type) 21 and image-sensor circuit board 23. In these figures, the movement is managed by a switching worm gear and knob control 24. However, a feasible alternative not shown here is a motor-driven movement initiated by a button or lever control manipulated by the user.

2. Operation: Dual Camera With Compact-type Still-film Embodiment

Figure 10:
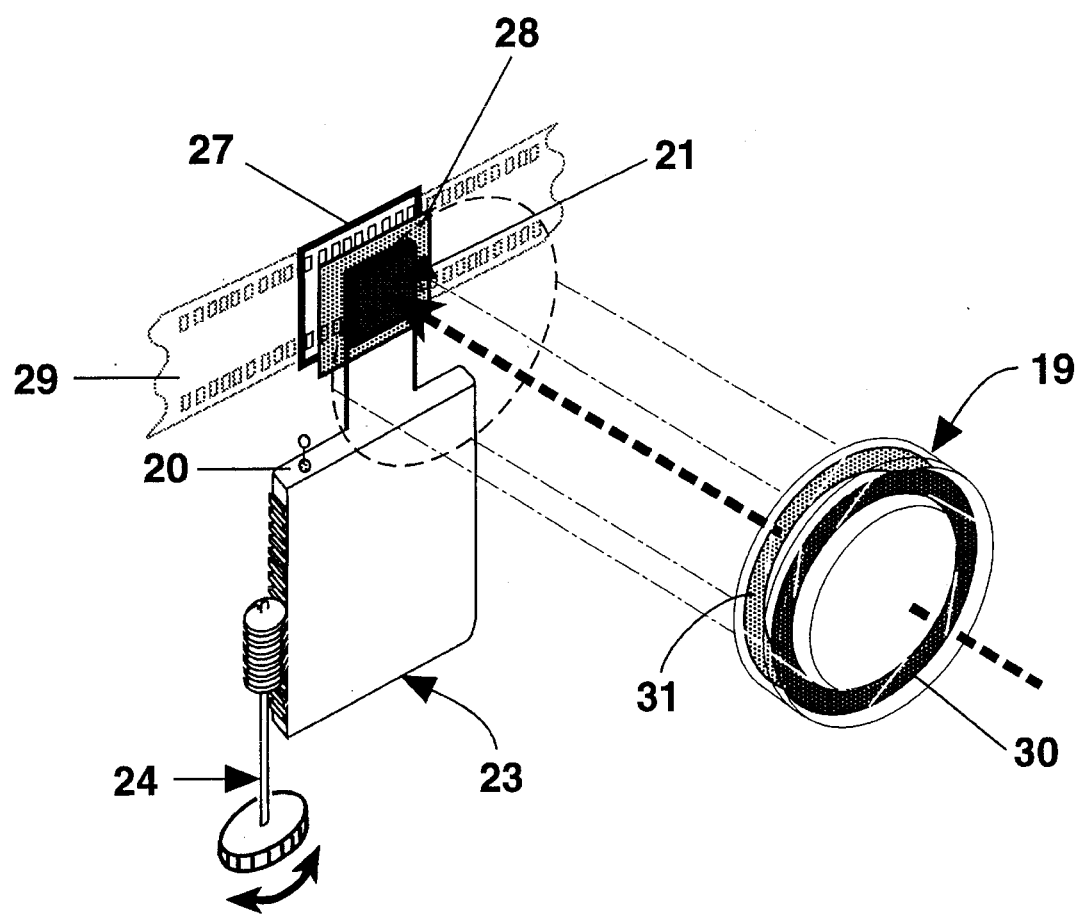

Operation of this compact-type embodiment of the dual video and still-film camera begins with the user's decision on which mode to use. If the user elects the video mode (FIG. 10), he or she turns the switching worm gear and knob 24 to a fixed-click position in order to extend the image sensor 21 into the path of the light image. Now an electrical contact point 20 on the leading edge of the image-sensor circuit board 23 meets a corresponding contact point on the camera body and completes a circuit connection to the camera electronic micro controller. The micro controller in turn automatically immobilizes the lens shutter 30 and the aperture diaphragm 31 (if this camera embodiment utilizes an aperture diaphragm). The shutter is fully opened and immobilized so that during video operation the light image is unimpeded from striking the image sensor or CCD. The aperture diaphragm is immobilized initially at a default opening set by the factory. However, the micro controller allows the manual diaphragm control, if there is one, to override the automatic, in case the user wishes to select an alternate f-stop or aperture opening.

Figure 11:
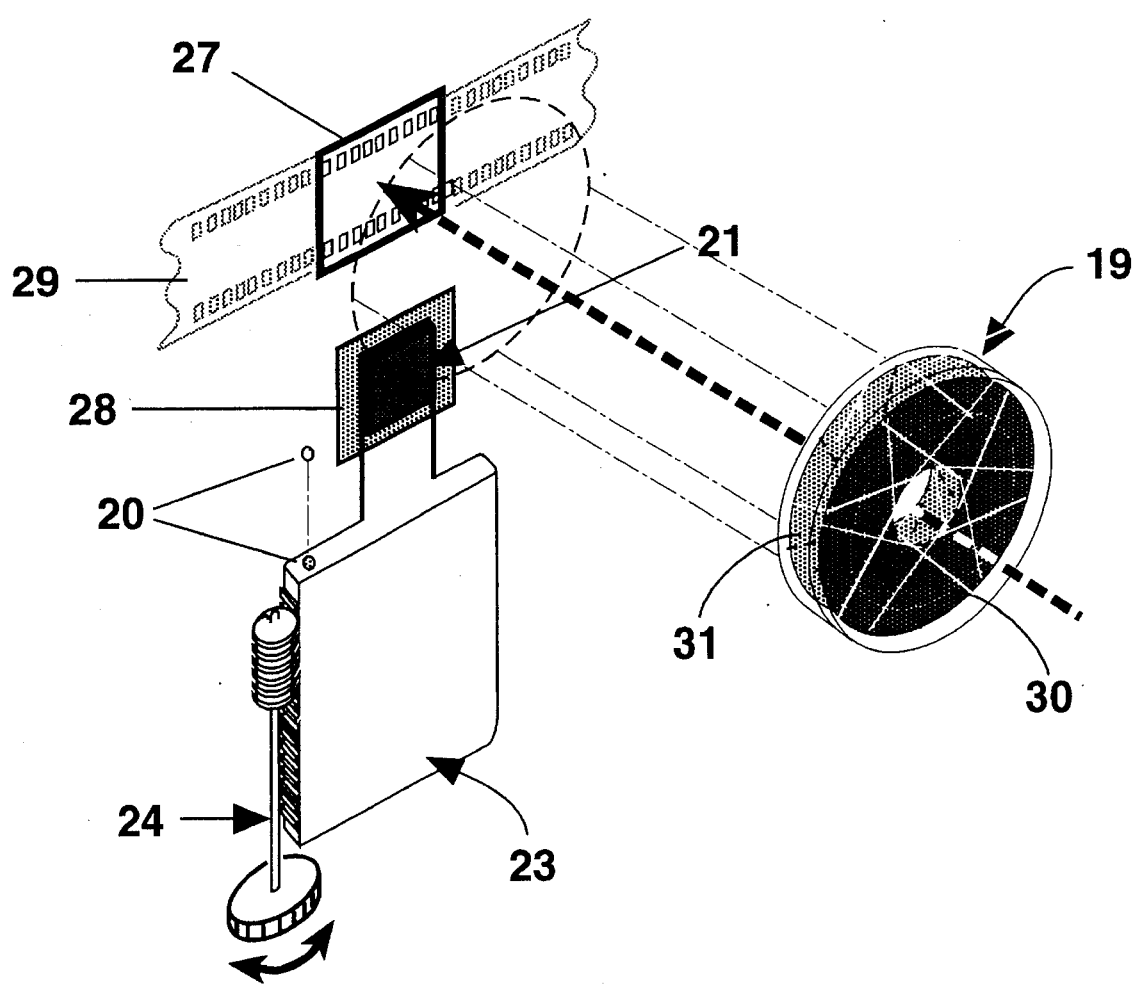

If the user elects the still-film mode (FIG. 11), he or she turns the switching worm gear and knob 24 in the opposite direction to a fixed-click position in order to retract the image sensor 21 completely outside the path of the light image. Now the electrical contact points 20 separate to break the circuit connection which had immobilized the lens shutter 30 and aperture diaphragm 31 (if this camera embodiment utilizes an aperture diaphragm). The shutter is now freed to open when the user presses or turns the shutter release control. If this camera embodiment utilizes an aperture diaphragm and offers both automatic and manual diaphragm control, the user, before releasing the shutter, can manually adjust the aperture diaphragm or can accept the automatic diaphragm setting.

Conclusion

Whether embodied in a single-lens reflex (SLR) type or compact type of still-film apparatus, the invention incorporates an advanced digital image-sensing technology in a dual video and still-film camera in such a way that the user can easily switch between the video and still-film modes with the assurance that the inactive mode will not interrupt and impair the active mode. The invention overcomes the inconvenience of carrying two cameras (a video recorder and a still film camera) or the frustration of finding oneself at a photography site only to discover that one was carrying the wrong type of camera for the purpose at hand. Easily carried and easy to use, the dual video and still-film camera fills a unique need in the worlds of popular and professional photography.

I claim:

1. A camera combining user-selected apparatus for still-film photography and user-selected apparatus for video photography, comprising a. an electronic image sensor with circuit board which elements can be extended into and retracted from the light-image line of sight as necessary for video or still-film operation, b. an electrical contact as signaling means for the camera micro controller to enable or disable certain elements, such as mirror, shutter, an aperture diaphragm, maintaining them in fixed positions needed for still-film or video operation, c. a conventional still-film photographing apparatus, with elements including film spool, film track, film controls, view finder, lens, flash device, and shutter and aperture diaphragm controls, and d. a conventional video photographing apparatus, with elements including tape deck and spools, video eyepiece, video head drum, sound recorder, and playback mechanism, and controls.

2. The camera of claim 1 wherein the still-film components are either of the single-lens reflex (SLR) type or of the compact type.

3. The camera of claim 2 wherein the compact type of still-film apparatus uses a rigid, thin spacer bonded to the back of the image sensor and sized to the focal plane chamber opening as a light-protecting means to avoid film exposure during video operation.

* * * * *